United States Patent
Erbes et al.

[11] Patent Number: 6,098,189
[45] Date of Patent: Aug. 1, 2000

[54] RELAY STATION FOR WIRELESS COMMUNICATION TRAFFIC

[75] Inventors: Norbert Erbes, Karlsruhe; Kur Hechfellner, Taufkirchen; Herbert Baumann, Munich, all of Germany

[73] Assignees: Siemens Aktiengesellschaft, Munich; Standard Elektrik Lorenz AG, Stuttgart, both of Germany

[21] Appl. No.: 06/788,557

[22] Filed: Aug. 5, 1985

[30] Foreign Application Priority Data

Aug. 10, 1984 [DE] Germany .............................. 34 29 454

[51] Int. Cl.[7] .................................................. H04B 15/00
[52] U.S. Cl. ............................................................. 714/758
[58] Field of Search .............................. 455/29; 372/2.1, 372/2.2; 375/1, 200, 202

[56] References Cited

U.S. PATENT DOCUMENTS

| | | | |
|---|---|---|---|
| 3,407,354 | 10/1968 | Wheeler | 455/29 |
| 3,665,472 | 5/1972 | Kartchner et al. | . |
| 4,193,030 | 3/1980 | Rabow et al. | 375/2.2 |
| 4,442,527 | 4/1984 | Munday | 455/29 X |
| 4,545,061 | 10/1985 | Hileman | 375/2.2 X |
| 4,578,816 | 3/1986 | Rabain et al. | 375/2.2 X |
| 4,587,661 | 5/1986 | Schiff | . |
| 4,617,674 | 10/1986 | Mangulis et al. | . |
| 4,653,068 | 3/1987 | Kadin | . |
| 4,703,474 | 10/1987 | Foschini et al. | . |

*Primary Examiner*—Mark Hellner
*Attorney, Agent, or Firm*—Hill & Simpson

[57] ABSTRACT

A relay station utilizes the frequency hopping principle for the purpose of protection against intentional interference. Normally, the frequency hopping range available cannot be utilized for the frequency hopping operation because an indispensable minimum signal-to-noise ratio must be observed between the receiving frequency and the transmitting frequency of the relay station. In order to eliminate this disadvantage, the transmitter of the relay station is synchronized to the receiver by way of an interface connection and, with the aid of this synchronization, the desired frequency hopping in the entire available frequency hopping range for the transmitter and the receiver of the relay station can be controlled pursuant to observation of the required minimum signal-to-noise ratio.

8 Claims, 3 Drawing Sheets

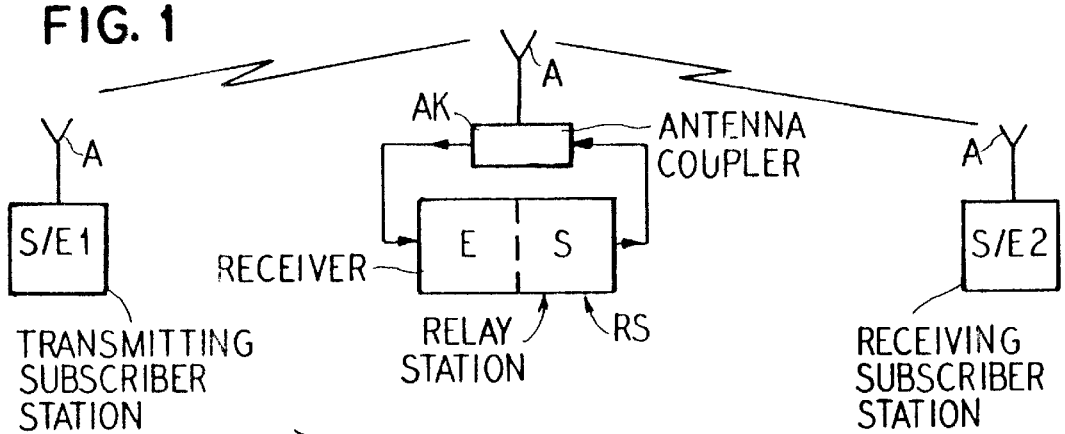
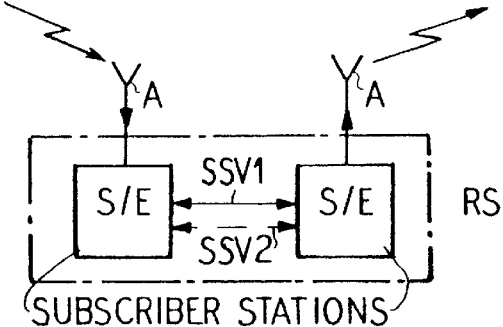
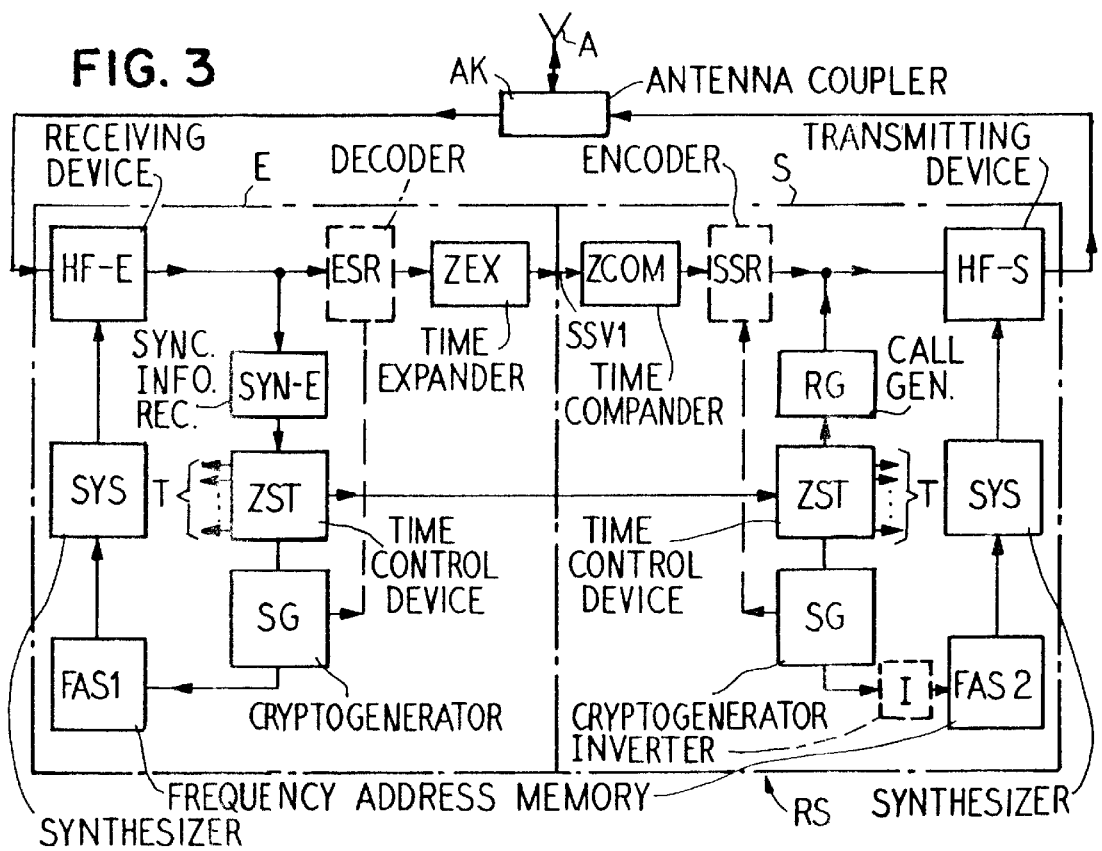

RELAY STATION FOR WIRELESS COMMUNICATION TRAFFIC

BACKGROUND OF THE INVENTION

1. Field of the Invention

The present invention relates to a relay station for conducting radio communication between two subscriber stations, consisting of a receiver which is capable of being synchronized to the transmitting subscriber station, and a transmitter having a transmitting frequency which has, in relation to the receiving frequency of the receiver, a satisfactorily-large signal-to-noise ratio, as well as an interface connection between the receiver output and the transmitter input for the transfer of useful signals received by the transmitting subscriber station to the transmitter for the purpose of repeated transmission to the receiving subscriber station.

2. Description of the Prior Art

In radio networks there is occasionally the necessity of enlarging the transmitting range of individual subscriber stations belonging to the radio network or, however, due to unfavorable topographic conditions of subscriber stations located in shadow regions, to make possible reliable radio connections to remote subscriber stations. For this purpose, use is then made of a special transmitting-receiving station which can reliably receive a transmitting subscriber station, on the one hand, and in addition, the receiving subscriber station can also, in turn, reliably receive the transmitter of the transmitting-receiving station, hereinafter called a relay station. Relay stations of this type are known, for example, from the German patent 24 02 810 A1.

Since, in the case of such a relay station, the transmitter and the receiver must be at one location, precaution must be exercised to ensure that the electro-magnetic energy radiated by the transmitter cannot become active in the input of the receiver and block the receiver through overdriving thereof. In other words, it must be ensured that, in the case of such a relay station, the receiver and the transmitter always operate at different frequencies whose mutual frequency separation must be selected to be so great that the minimum requirements of the frequency separation to be made here are met.

In the case of mobile radio networks in tactical use, generally special measures must additionally be effected which render the desired radio connections resistant to intentional interference or jamming. In order to achieve this increased interference resistance, as the German patent 32 30 726 A1 points out, for example, it is known to vary the radio frequency in brief time intervals suddenly and in a pseudo-random manner in a larger frequency range. The application of such a frequency hopping method to a radio connection between two subscriber stations pursuant to interconnection of the relay station makes it necessary to subdivide the frequency jumping region, present per se, for the receiver and the transmitter of the relay station into a lower band and an upper band. On the partial connection path between the transmitting subscriber station and the relay station, a pseudo-random radio frequency change in the lower band, and simultaneously such a pseudo-random radio frequency change in the upper band, can then be carried out on the partial connection path between the transmitter of the relay station and the receiving subscriber station. In this manner, the satisfactory separation between the receiving frequency and the transmitting frequency of the relay station is perserved, and also the minimum separation requirements can be observed without difficulty.

However, the disadvantage of this solution is that the frequency bandwidth, available per se for the frequency hopping, is respectively cut in half relative to one of the mentioned partial connection paths. The capability to resist interference through such a frequency hopping method is, in particular, proportional to the bandwidth of the available frequency hopping range.

SUMMARY OF THE INVENTION

The object of the present invention, therefore, is to provide for interference-resistant communication transmission between two subscriber stations intercorrected with a relay station of the initially-mentioned type, and in particular to provide a relay station which, by observing the minimum signal-to-noise ratio to be required between its transmitting frequency and its receiving frequency, permits a full exploitation of the frequency hopping range, available per se, on both partial connection paths.

The above object is achieved, according to the present invention, in a relay station for conducting radio communication between two subscriber stations, consisting of a receiver, capable of being synchronized to the transmitting subscriber station, and a transmitter, having a transmitting frequency which has a sufficiently-large signal-to-noise ratio in relation to the receiving frequency of the receiver, as well as an interface connection between the receiver output and the transmitter input, for the transfer of useful signals received by the transmitting subscriber station, to the transmitter for repeated transmission to the receiving subscriber station, and is particularly characterized in that, in the case of utilization of a frequency hopping method between the time control for the frequency hopping device of the transmitter and of the receiver, an additional interface connection is provided for the purpose of locking the transmitter to the synchronization of the receiver, which is synchronized to the transmitting subscriber station, and that the frequency hopping devices of the receiver and the transmitter, which respectively include a synthesizer, controlled via a frequency address memory by a cryptogenerator generating pseudo-random memory addresses, are so designed that the hopping frequency sequences, simultaneously generated by the frequency hopping devices in synchronism within a common frequency band always maintain the required minimum signal-to-noise ratio between the respectively selected receiving and transmitting frequencies.

According to the invention, the point of departure is the knowledge that a subdivision of the available frequency hopping range into a lower band for the one partial connection path or radio link of the subscriber stations, to be inter-connected via the relay station, for the frequency hopping operation can be omitted if, through a suitable interface connection between the receiver and the transmitter it is ensured that, after termination of the synchronization procedure between the transmitting subscriber station and the receiver of the relay station, the synchronization of the receiver is transferred to the transmitter of the relay station. The synchronization of the frequency hopping operation of the transmitter through the receiver-side synchronization, therefore, in an extremely advantageous fashion, provides the possibility of conducting, on both radio links, a pseudo-random frequency hopping operation in the total available frequency band without running the risk that even only occasionally the minimum requirements of the signal-to-noise ratio between the receiving frequency and the transmitting frequency will no longer be met.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a block diagram representation of a radio path between a transmitting station and a receiving station via a relay station;

FIG. 2 is a block diagram of a relay station constructed with two subscriber stations in accordance with the present invention;

FIG. 3 is a block circuit diagram of a relay station comprising a receiver and a transmitter;

DESCRIPTION OF THE PREFERRED EMBODIMENTS

Figure 4:
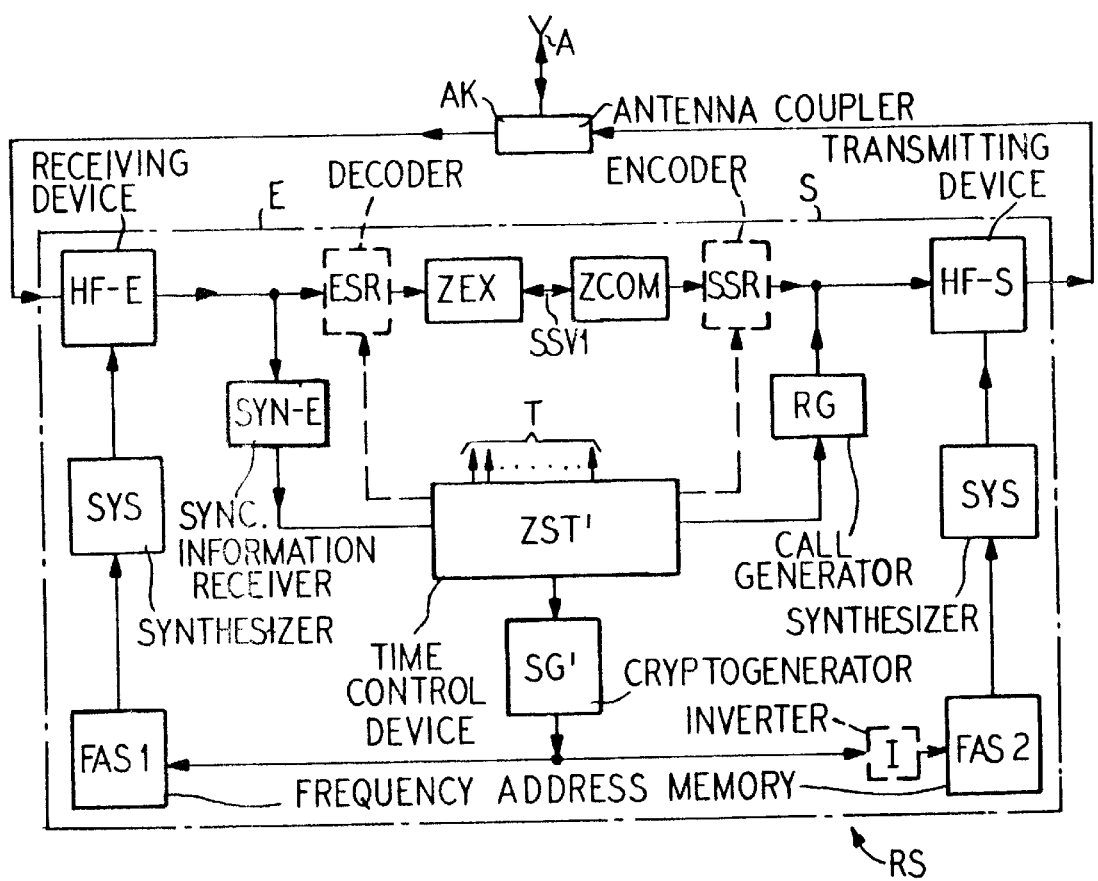
FIG. 4 is a block circuit diagram of a variation of the relay station according to FIG. 3.

The schematic illustration of a radio connection according to FIG. 1 comprises two subscriber stations S/E1 and S/E2 each having an antenna A. Since a direct connection, due to the distance or topographically-unfavorable terrain, is not possible between these two subscriber stations, a radio connection proceeds via a relay station RS which comprises a receiver E and a transmitter S and whose antenna A is in direct connection via an antenna coupling device AK with the input of the receiver, on the one hand, and with the output of the transmitter S, on the other hand. During the establishment of a connection, for example, proceeding from the subscriber station S/E1, the connection between this subscriber station and the relay station RS is first established and, in this connection, the necessary synchronization procedure between the transmitting subscriber station S/E1 and the receiver E of the relay station RS is carried out. In-carrying out a frequency hopping procedure, according to the present invention, the synchronization of the receiver E is then transferred to the transmitter S, and the connection from the transmitter S of the relay station RS to the receiving subscriber station S/E2 is established.

As the schematic illustration according to FIG. 2 shows, the relay station RS can be constructed from two subscriber stations S/E which cooperate with one another, so to speak, back-to-back. The cooperation is effected via two interface connections SSV1 and SSV2, of which the interface connection SSV1 forwards the information transmitted by the transmitting subscriber station and received by the receiver of the one subscriber station S/E, to the transmitter of the other subscriber station S/E. The interface connection SSV2 is necessary for the transfer of the synchronization of the receiver of the one subscriber station to the transmitter of the other subscriber station.

The relay station RS according to FIG. 1 is illustrated once again in FIG. 3 in a block circuit diagram showing further details thereof. The receiver E comprises, at its input, a high frequency (HF) receiving device HF-E in which the successive, received signal bursts are converted, with respectively varying radio carrier frequency, into an intermediate frequency region and are subsequently supplied to a time expander ZEX. The time expander ZEX converts the discontinuously-arriving information flow into a continuous signal flow and transmits the same in this form to the transmitter S. The output of the HF receiving device is also connected to the input of a synchronous information receiver SYN-E which detects the synchronous information in the incoming signals and supplies this information to a time control device ZST. The time control device ZST produces a series of clock pulse outputs T for the additional portions of the receiver E and also controls the cryptogenerator SG for the pseudo-random generation of memory addresses for the recall of frequency addresses for the synthesizer SYS which are stored in the frequency address memory FAS1. The latter delivers to the HF receiving device HF-E the conversion oscillator signal respectively required for the conversion to a specified intermediate frequency range.

The cryptogenerator SG, controlled by the time control device ZST, together with the frequency address memory FAS1 and the synthesizer SYS, forms the frequency hopping device of the receiver E. In case the signal, transmitted by the transmitting subscriber station S/E1 according to FIG. 1 in successive information bursts, has additionally been subjected to an encoding and in the receiver E of the relay station RS, generally a decoding is required before it can be transmitted to the transmitter S in continuous form. This fact is illustrated in FIG. 3 via broken lines; in particular, in the form of a decoder ESR in the path between the HF receiving device HF-E and the time expander ZEX. The decoder ESR, in the same manner as the frequency address memory FAS1, is supplied with a necessary code information by the cryptogenerator SG.

The transmitter of the relay station RS is constructed in a manner similar to the receiver. The information to be transmitted present at the output of the time expander ZEX in continuous form is supplied via the interface connection SSV1 to the time compander ZCOM of the transmitter, which again converts the signal to be transmitted by the transmitter S into successive information bursts. From the output of the time compander ZCOM the information is supplied to a high-frequency (HF) transmitting device HF-E, possibly after encoding in a cryptographer. Corresponding to the receiver E, the information bursts in the HF transmitting device HF-S are converted to the radio frequency range and supplied via the antenna coupler AK to the antenna A. The radio frequency carrier which alternates in frequency in a pseudo-random manner from information bursts-to-information bursts is again made possible by a frequency hopping device which is formed in the same manner as in the case of the receiver E from a cryptogenerator SG, controlled by a time control device ZST of the transmitter, in conjunction with a frequency address memory FAS2 and a synthesizer SYS.

The cryptogenerator SG of the transmitter, also delivers, as required, the code signal for the cryptographer or encoder SSR. In the connection between the transmitting-side cryptogenerator SG and the input of the frequency address memory FAS2, as shown in a broken line, an inverter I is additionally illustrated which shall be discussed in conjunction with the description of FIGS. 5 and 6. The time control device ZST of the receiver and of the transmitter cooperate via the interface connection SSV2 so that, in this manner, the transfer of the synchronization of the receiver E to the transmitter S becomes possible.

The variation of a relay station RS according to FIG. 3, which is illustrated in FIG. 4, differs from the embodiment according to FIG. 3 merely by virtue of the fact that here the additional interface connection SSV2 is integrated in the time control device ZST in that the transmitter time control device and the receiver time control device are combined to form a common time control device ZST', and this common time control device ZST' controls a crypto-generator SG' common to both frequency address memories FAS1 and FAS2 of the receiver and of the transmitter.

Through synchronization between the frequency hopping device of the receiver and the frequency hopping device of the transmitter, made possible via the additional interface connection SSV2, it becomes possible, also in the case of memory addresses for the frequency address memories FAS1 and FAS2, generated in a pseudo-random manner, to reliably observe the minimum signal-to-noise ratio required between the receiving frequency and the transmitting frequency.

Figure 5:
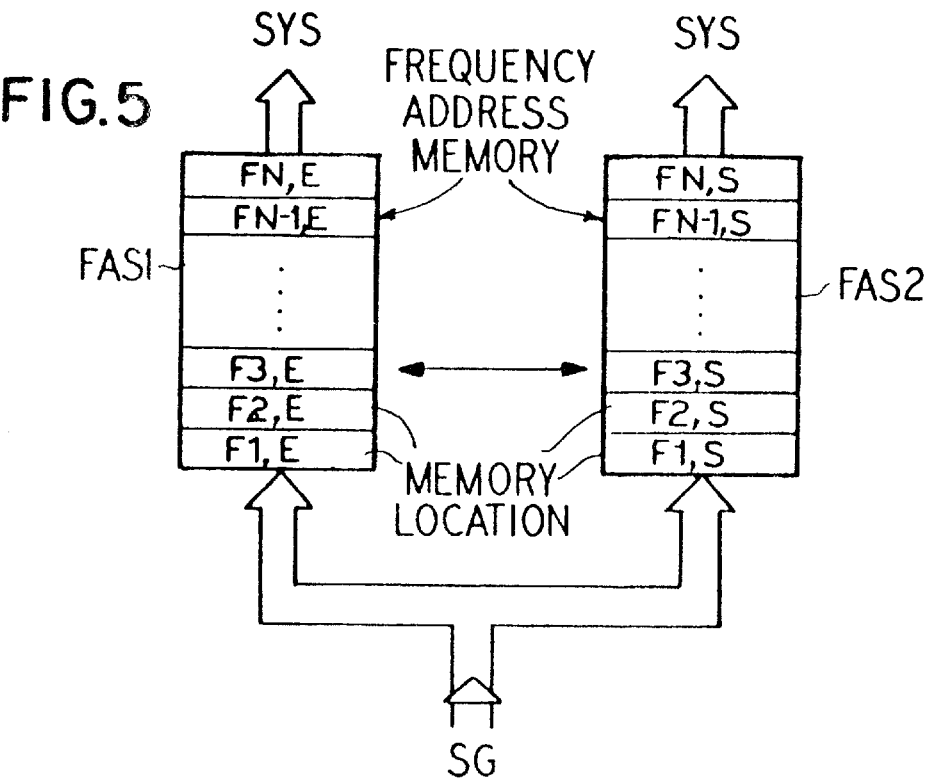
FIG. 5 is a schematic illustration for the design and control of the frequency address memories of the frequency hopping devices of the transmitter and the receiver of the relay station according to FIGS. 3 and 4.

In the schematic illustration according to FIG. 5, this is achieved in that a different frequency group is associated with each of the two frequency address memories FAS1 and FAS2. In the frequency address memory FAS1, the frequency addresses stored in the memory cells, from bottom to top, are referenced F1, E; F2, E; . . . FN–1, E; FN, E. In the same manner, the frequency address F1, S; F2, S; . . . FN–1, S; FN, S are stored, from bottom to top, in the memory locations of the frequency address memory FAS2 of the transmitter. The frequency groups stored in the two frequency address memories of the receiver and the transmitter are so selected that, in the case of activation of both frequency address memories with the same memory address, indicated by the double arrow, the frequency addresses therefore recalled from the frequency address memories always generate a radio frequency receiving frequency and a radio frequency transmitting frequency which have the required minimum signal-to-noise ratio from one another.

Figure 6:
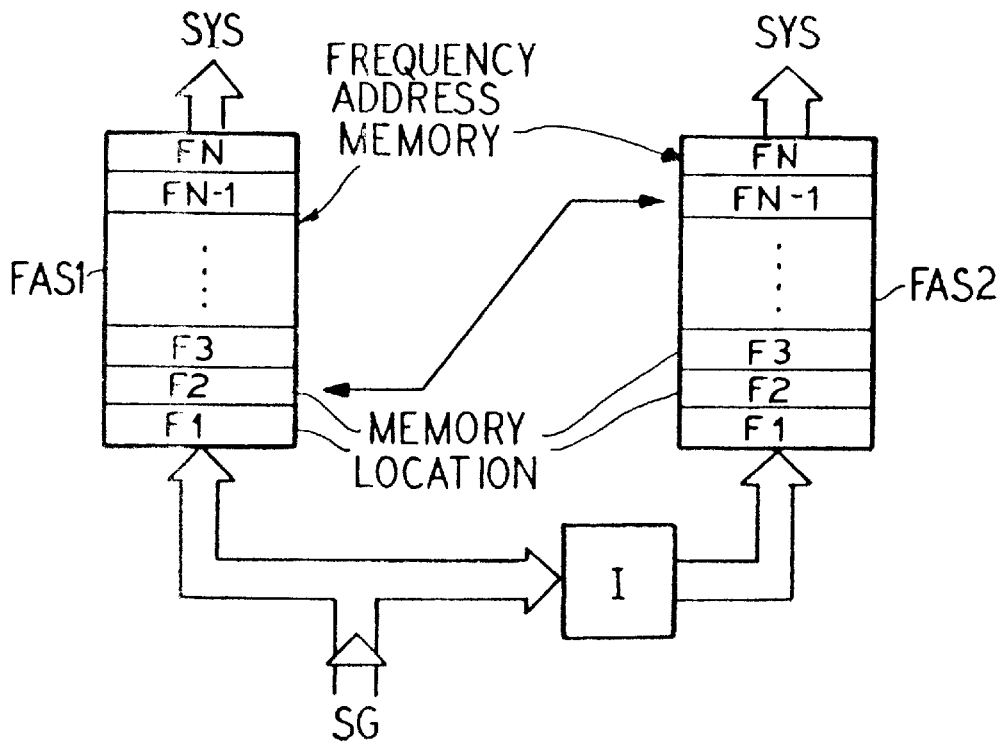
FIG. 6 is another schematic illustration for the design and control of the frequency address memories of the frequency hopping device of the transmitter and the receiver of the relay station according to FIGS. 3 and 4.

An additional solution is illustrated in FIG. 6. Here, both the frequency address memories FAS1 and FAS2 have the same frequency group F1, F2, . . . FN–1 and FN in their memory locations succeeding one another from the bottom to the top. In order to be able to maintain the required minimum signal-to-noise ratio between the respective receiving frequency and transmitting frequency, correspondingly-different memory addresses for the two frequency address memories FAS1 and FAS2 must be generated by the cryptogenerators SG. In order to accomplish this, the memory addresses for the transmitter and the receiver, generated in pseudo-random fashion by the cryptogenerator, are first identically generated, but then the memory addresses are supplied to the transmitting-side frequency address memory FAS2, not directly, as in the case of the receiver, but via the inverter I which is indicated by broken lines in FIGS. 3 and 4. In this simple manner, the frequency addresses, which are sufficiently different from the generation of the radio frequency carriers of the transmitter and the receiver, are recalled from the frequency address memory FAS1 and the frequency address memory FAS2, as indicated by the double arrow.

Taking into account the frequency group stored in the frequency address memories FAS1 and FAS2, naturally, instead of an inverter, also any other network can be arranged which conducts the necessary address memory conversion for the frequency address memory FAS2.

The above-described embodiments of a relay station constructed in accordance with the present invention are primarily suited for use in tactical radio networks wherein, for protection against intentional extraneous interference on the radio connection paths, use must be made of a frequency hopping operation.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a relay station for conducting radio transmission between two subscriber stations, the relay station being of the type comprising a receiver capable of being synchronized to a transmitting subscriber station, and a transmitter having a transmitting frequency, an interface connection between the receiver output and the transmitter input for the transfer of useful signals received from the transmitting subscriber station to the transmitter for retransmission to a receiving subscriber station, and in which the receiver and the transmitter each include a frequency hopping device for respectively receiving and transmitting signal bursts from the transmitting station to the receiving sation, and wherein the transmitter and receiver always operate at different frequencies with a frequency separation, the improvement therein comprising:

an additional interface connection between the transmitter and the receiver for locking the transmitter to the synchronization of the receiver; and said frequency hopping devices of the receiver and the transmitter each comprise a synthesizer, a frequency address memory connected to and operable to control said synthesizer, a cryptogenerator connected to said frequency address memory and operable to generate and to provide to said frequency address memory pseudo-random memory addresses so that the frequency hopping sequences generated by said frequency hopping devices in synchronism within a common frequency band always have a signal-to-noise ratio between the respectively just-activated receiving and transmitting frequencies which is sufficient to allow transmissions of intelligence and reception.

2. The improved relay station of claim 1, wherein:

said frequency address memories of said transmitter and receiver comprise memory locations storing memory address-related different frequency addresses and the memory addresses generated in a time-synchronous manner by said cryptogenerators agree with one another.

3. The improved relay station of claim 1, wherein:

said frequency address memories of the transmitter and the receiver comprise memory locations storing memory address-related like frequency addresses; and further comprising means connected between one of said cryptogenerators and the respective frequency address memory for converting the pseudo-random addresses generated by aid cryptogenerator in a time-synchronous manner so that the frequency addresses differ from one another so that said signal-to-noise ratio between the receiving frequency and the transmitting frequency is maintained.

4. The improved relay station of claim 3, wherein:

said means for converting a memory address comprises an inverter connected between said cryptogenerator and said frequency address memory.

5. The improved relay station of claim 4, wherein:

said inverter is connected between said cryptogenerator and said frequency address memory of said transmitter.

6. The improved relay station of claim 1, where in:

the receiver comprises a receiving portion of a first subscriber station;

the transmitter comprises a transmitting portion of a second subscriber station; and both subscriber stations are additionally provided with two interface connections interconnecting both said subscriber stations.

7. The improved relay station of claim 1, wherein:

the transmitter and the receiver each comprise a time control device, said time control device of said receiver operable to produce timing signals for the receiver in response to synchronization information received from the transmitting subscriber station and said time control device of said transmitter operable to produce timing signals for the transmitter in response to signals received from said time control device of said receiver via said additional interface connection.

8. The improved relay station according to claim 7, wherein:

said additional interface connection and said time control devices are integrated into a single time control unit; and said cryptogenerators are integrated into a common crypto-generator unit.

* * * * *